(12) United States Patent
Ding

(10) Patent No.: US 11,612,821 B2
(45) Date of Patent: Mar. 28, 2023

(54) TECHNIQUES FOR USER RANKINGS WITHIN GAMING SYSTEMS

(71) Applicant: Blizzard Entertainment, Inc., Irvine, CA (US)

(72) Inventor: Tian Ding, Lake Forest, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 0 days.

(21) Appl. No.: 17/338,536

(22) Filed: Jun. 3, 2021

(65) Prior Publication Data
US 2022/0387894 A1 Dec. 8, 2022

(51) Int. Cl.
*A63F 13/795* (2014.01)
*A63F 13/46* (2014.01)

(52) U.S. Cl.
CPC ............ *A63F 13/795* (2014.09); *A63F 13/46* (2014.09); *A63F 2300/556* (2013.01); *A63F 2300/61* (2013.01)

(58) Field of Classification Search
CPC ..................... A63F 13/795; A63F 13/46; A63F 2300/556; A63F 2300/61
See application file for complete search history.

(56) References Cited

U.S. PATENT DOCUMENTS

| | | | | | |
|---|---|---|---|---|---|
| 3,392,862 A | * | 7/1968 | Faulstich | ............... | B65D 41/48 215/254 |
| 4,591,161 A | * | 5/1986 | Vanderhoof | .......... | A63F 3/0423 273/272 |
| 7,124,372 B2 | * | 10/2006 | Brin | .................... | H04L 12/1822 715/757 |
| 2003/0001890 A1 | * | 1/2003 | Brin | .................... | H04L 12/1822 715/753 |
| 2005/0289103 A1 | * | 12/2005 | Bier | .................... | G06F 16/3322 |

(Continued)

OTHER PUBLICATIONS

Weng, R.C. "A Bayesian Approximation Method for Online Ranking", Journal of Mach. Learning Research 12 (2011), pp. 267-300, published Jan. 2011, 34pgs.

(Continued)

*Primary Examiner* — Seng H Lim
(74) *Attorney, Agent, or Firm* — Hickman Becker; Bingham Ledesma LLP

(57) ABSTRACT

Techniques are described herein for a gaming system that maintains an internal score and an external score for each user. The system maintains the internal scores to reflect demonstrated user skill. The system uses the accurate internal scores to facilitate communication between client computing devices associated with users that have been selected to participate in gameplay instances based on the internal scores. The external scores maintained by the system displayed to the users. Because the external scores are not used for matchmaking, the external scores may be adjusted in any way without requiring internal consistency. For example, to combat gameplay stagnation, the gameplay system periodically resets maintained external scores. For a time, comparisons between the reset external scores do not accurately reflect the users' rankings within the game. However, as the users participate in gameplay, the external scores return to levels that are similar to the users' internal scores.

21 Claims, 6 Drawing Sheets

(56) References Cited

U.S. PATENT DOCUMENTS

| | | | |
|---|---|---|---|
| 2016/0034305 A1* | 2/2016 | Shear | H04L 47/70 |
| | | | 707/722 |
| 2016/0147754 A1* | 5/2016 | Li | G06F 16/24578 |
| | | | 707/748 |
| 2020/0269139 A1* | 8/2020 | Aghdaie | A63F 13/795 |

OTHER PUBLICATIONS

'Rank (League of Legends),' Gameplay elements, Wiki Fandom, https://leagueoflegends.fandom.com/wiki/Rank_(League_of_Legends), printed Apr. 30, 2011, 11pgs.

'LoL MMR Explained', blog—LolBoosts, published Jan. 12, 2020, https://lolboosts.com/blog/what-is-lol-mmr, printed Apr. 30, 2011, 7pgs.

\* cited by examiner

| | ORIGINAL INTERNAL SCORE | NORMALIZED INTERNAL SCORE |
|---|---|---|
| 502 | -5.0 | -4.0 |
| 504 | -3.951 | -3.090 |
| 508 | -3.782 | -2.878 |
| 510 | -3.572 | -2.748 |
| 512 | -3.403 | -2.652 |
| 514 | -3.240 | -2.576 |
| 516 | -3.112 | -2.512 |
| ... | ... | ... |
| 518 | 5.277 | 2.457 |
| 520 | 5.459 | 2.512 |
| 724 | 5.671 | 2.576 |
| 526 | 5.959 | 2.652 |
| 528 | 6.676 | 2.878 |
| 530 | 7.416 | 3.090 |
| 532 | 12.233 | 4.0 |

TECHNIQUES FOR USER RANKINGS WITHIN GAMING SYSTEMS

FIELD OF THE INVENTION

The present invention relates to maintaining user rankings within gaming systems, and, more specifically, to maintaining the rankings based on bifurcated user scores that comprise internal user scores that reflect user skill and external user scores that are made available to the users.

BACKGROUND

In many electronic games, such as online multiplayer games, players gauge the success of their gameplay based on a rank or score assigned to them by the game based on their gameplay. In the initiation phase of a game, during which the user learns the game rules and basic strategies, that rank or score can increase rapidly, reflecting the player's rapidly improving skill level. However, after the rules and basic strategies are learned, the rate at which the player's score changes can slow down dramatically. This is especially true when the game requires skill that is acquired over time, given that it can take a long time for an experienced player to bring their skills to the "next level".

The lack of score movement can create a sense of stagnation for the player, which is undesirable. One way to combat perceived stagnation is to divorce the player's score from the player's skill in playing the game. However, when a player's score does not reflect the skill of the player, it can be difficult to tailor skill-based aspects of the game to the player. For example, in games that match players against each other, it is desirable to match players of similar skill levels. However, scores that do not reflect the users' skill levels can create lopsided matches, which tend to be less enjoyable to the players.

Another way to combat user stagnation is to periodically introduce new game features and/or game rules into gameplay. However, it can be expensive in human time and computing resources to develop new game features and to implement new game rules. Furthermore, it can be difficult for some players to adjust to new game features and rules. Also, some kinds of game adjustments invite user exploitation, which can be difficult to counteract.

Thus, it would be beneficial to combat "score-stagnation" without divorcing the user's score from the user's skill in playing the game, and without requiring the expense of developing new game features and rules.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
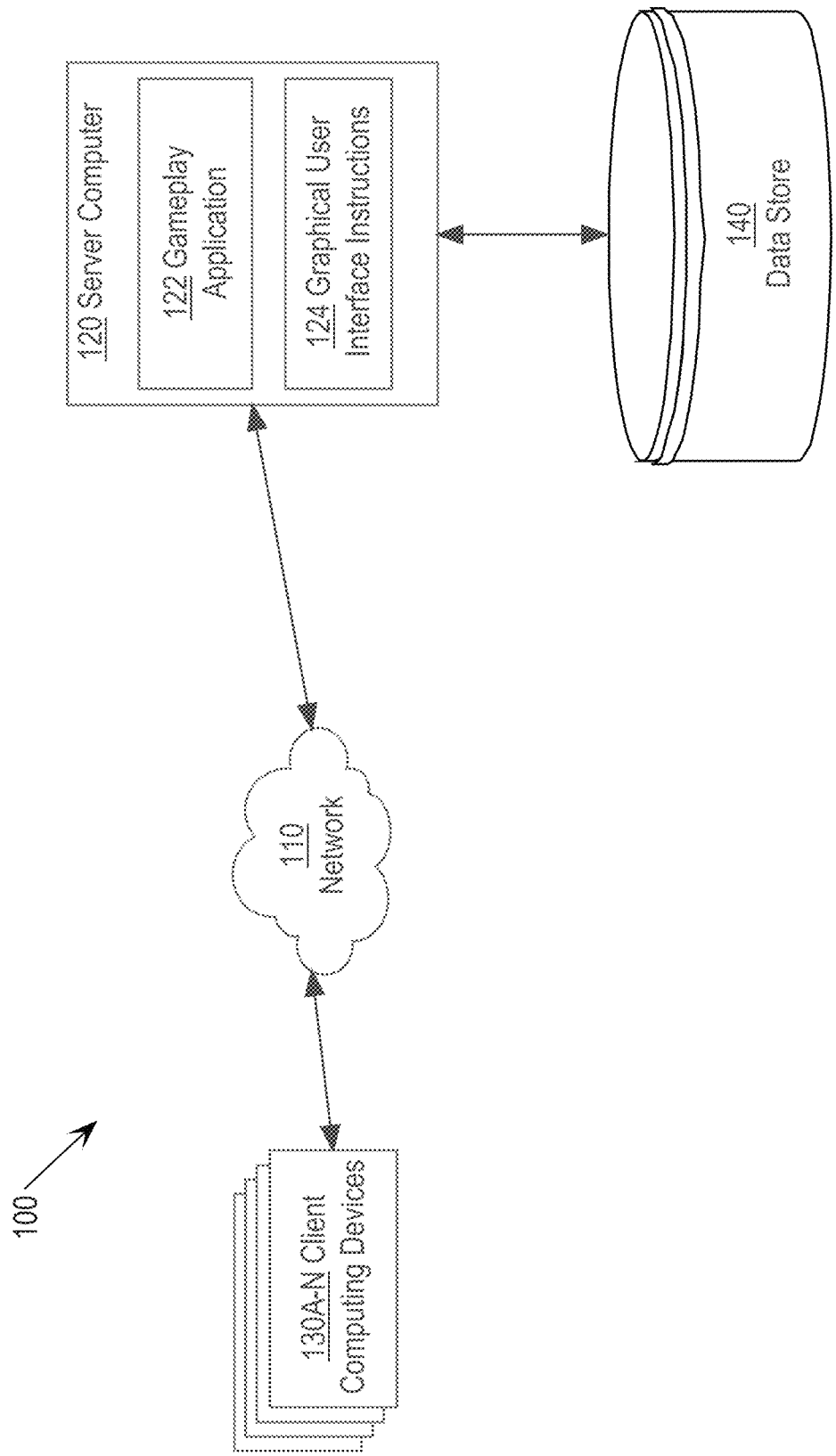
FIG. 1 depicts an example network configuration that includes a server computer running a gameplay application.

In the following description, for the purposes of explanation, numerous specific details are set forth in order to provide a thorough understanding of the described techniques. It will be apparent, however, that the described techniques may be practiced without these specific details. In other instances, well-known structures and devices are shown in block diagram form in order to avoid unnecessarily obscuring the described techniques.

General Overview

Techniques are described herein for a gaming system that bifurcates user scores into (a) an internal score, and (b) an external score, for each user. The gameplay system adjusts both the maintained internal and external scores for the users based on gameplay results.

INTERNAL SCORES: The internal scores are designed to accurately reflect the current skill level of a user. According to an embodiment, the internal rating system assumes a particular probability distribution, which is designed to represent the game and the real-life skill distribution among players. In a completely "closed" system, where no player gets in (new player) or leaves the game (churned player), the internal rating system would conform to a Gaussian distribution and, as such, would be "zero-sum".

Because they reflect a user's current skill level, such internal scores may, for example, be used by the gaming system to tailor skill-based aspects of gameplay to the users. Ways to tailor skill-based aspects of gameplay include assigning users to multiplayer gameplay instances (e.g., matching similar-skill-level users with each other) or providing challenges within the gameplay that are appropriate for the user's skill level.

To accurately reflect a player's current skill level, the gaming system typically derives a player's internal score based on that player's gameplay results gathered over an extended time period (e.g., spanning many gaming "seasons"). By avoiding the reset of internal scores at the start of each "season", the system can accurately match users that are similarly-skilled even at the start of new seasons, which increases the enjoyment of multiplayer gameplay instances. Thus, the gaming system uses the internal scores to facilitate communication between client computing devices associated with users that have been selected, based on their internal scores, to participate in gameplay instances.

In practice, the internal scoring system does not maintain the designed probability distribution given new content releases, balance updates, meta changes, and players entering and leaving the game system. Thus, according to an embodiment, the maintained internal scores are also periodically normalized to a particular probability distribution (e.g., a modified Gaussian distribution), which adjust the distribution of the internal scores to better align with the assumptions behind the internal rating system. This normalization avoids clumping (e.g., where the top 5% of internal score values are assigned to 20% of the players). Normalizing the distribution curve of the internal scoring system renders the internal scores more mathematically "correct", where comparisons between normalized internal scores of users accurately measure relative skill levels of the users. Accordingly, normalization of the internal scores allows the gaming system to compare user skill levels more accurately, e.g., only the top players will have the top internal score values, while average-skilled players will tend to have internal scores in the middle of the internal score curve.

EXTERNAL SCORES: External scores are designed to avoid "score stagnation" to which internal scores are susceptible. Thus, in one embodiment, external scores are periodically "reset". For example, online games may have "seasons" at the start of which each user begins with the same default starting external score. Alternatively, external scores may be updated indefinitely, based on gameplay, without ever being reset, thereby reflecting more how long the player has been playing a game, and reflecting less the player's current skill level.

The external scores maintained by the gaming system are made available to the users, e.g., by displaying external scores to the users via associated client computing devices. Because the external scores are not used to tailor skill-based aspects of gameplay to the users, the external scores may be adjusted in any way without requiring internal consistency. For example, to combat gameplay stagnation, the gameplay system periodically resets maintained external scores (e.g., to zero). During a "ramp-up" time after the external scores are reset, the external scores are not very meaningful, since comparisons between the reset external scores do not accurately reflect the users' skill levels within the game. For example, at the start of a season, both the most-skilled player and the least-skilled player may be assigned a same starting external score of 1000.

Ideally, the ramp-up time would be as short as possible since players want their external scores to be meaningful. Using the techniques described hereafter, as the users participate in gameplay, the external scores may quickly return to levels that are similar to the users' internal scores (and therefore become accurate reflections of the player's actual skill levels). Periodically resetting external scores gives the users of the gaming system a sense of progression as they participate in gameplay instances to boost their external scores.

According to an embodiment, adjustments to external scores is not simply based on user gameplay during the current season, but is also based on the maintained internal scores for the users. For example, in order to hasten the return of external scores to internal score levels (i.e., reduce the ramp-up time), the gaming system bases a magnitude of an external score adjustment on a difference between the internal score and the external score of the user (referred to as application of a "progression factor") and, according to an embodiment, also applies an additional score-dependent augmentation, the magnitude of which is based on the difference between the internal score and the external score of the user. Specifically, without application of a progression factor and/or score-dependent augmentation, it would take more gameplay for higher-skilled users to bring external scores up to reflect their internal scores after an external score reset than it would take a lower-skilled user to bring external scores up to reflect their internal scores. Thus, by increasing the amount of external score gain based on the difference between the internal score and the external score of the users, users with high skill levels are able to raise their external scores to be similar to their internal scores more quickly than would otherwise be required without application of a progression factor, requiring less gameplay overall and fewer computing resources.

Bifurcated Scoring System

According to an embodiment, an example gameplay application 122 (implemented on a server computer 120 in an example network configuration 100 depicted in FIG. 1) maintains, in an example data store 140, bifurcated user scores that comprise an "internal" score and an "external" score for each user of the application. Gameplay application 122 accurately maintains the internal scores such that they reflect demonstrated user skill, and accordingly, the internal scores may be used to tailor skill-based aspects of gameplay to the users. Because the internal scores reflect demonstrated user skill, they change slowly inasmuch as the players demonstrate increased/decreased levels of skill through gameplay.

The slow-moving nature of internal scores can be frustrating to users that enjoy seeing gains in their scores. Thus, gameplay application 122 also maintains external scores for the users, which are made available to the users. These external scores are not used to tailor skill-based aspects of the game to the users, and as such, may be more dynamic than the maintained internal scores. For example, according to an embodiment, gameplay application 122 periodically resets the external user scores. Specifically, at the beginnings of periodic seasons of time, the external scores maintained by the application are reset to 0, and the users participate in gameplay to increase their external scores over the course of each season, as described in further detail below. Thus, external scores at the beginning of a gameplay season do not reflect user skill, and gradually become differentiated based on gameplay during the season. These seasonal resets give the users a sense of progression, and allow gameplay application 122 the room to increase external scores based on gameplay in a manner that is not restricted to demonstrated skill levels of the users. In such embodiments, internal scores are multi-season scores and external scores are seasonal scores.

As described in further detail below, gameplay application 122 updates an internal score of a given user based on results of the user's gameplay (such as wins/losses, a ranking result of multiplayer gameplay, strategic use of resources, the internal score of the user, the internal scores of other users participating with the user in multiplayer gameplay, continuity of gameplay, i.e., how consistently a user plays the game, etc.). According to an embodiment, gameplay application 122 adjusts maintained external scores based, at least in part, on the maintained internal scores.

Figure 2:
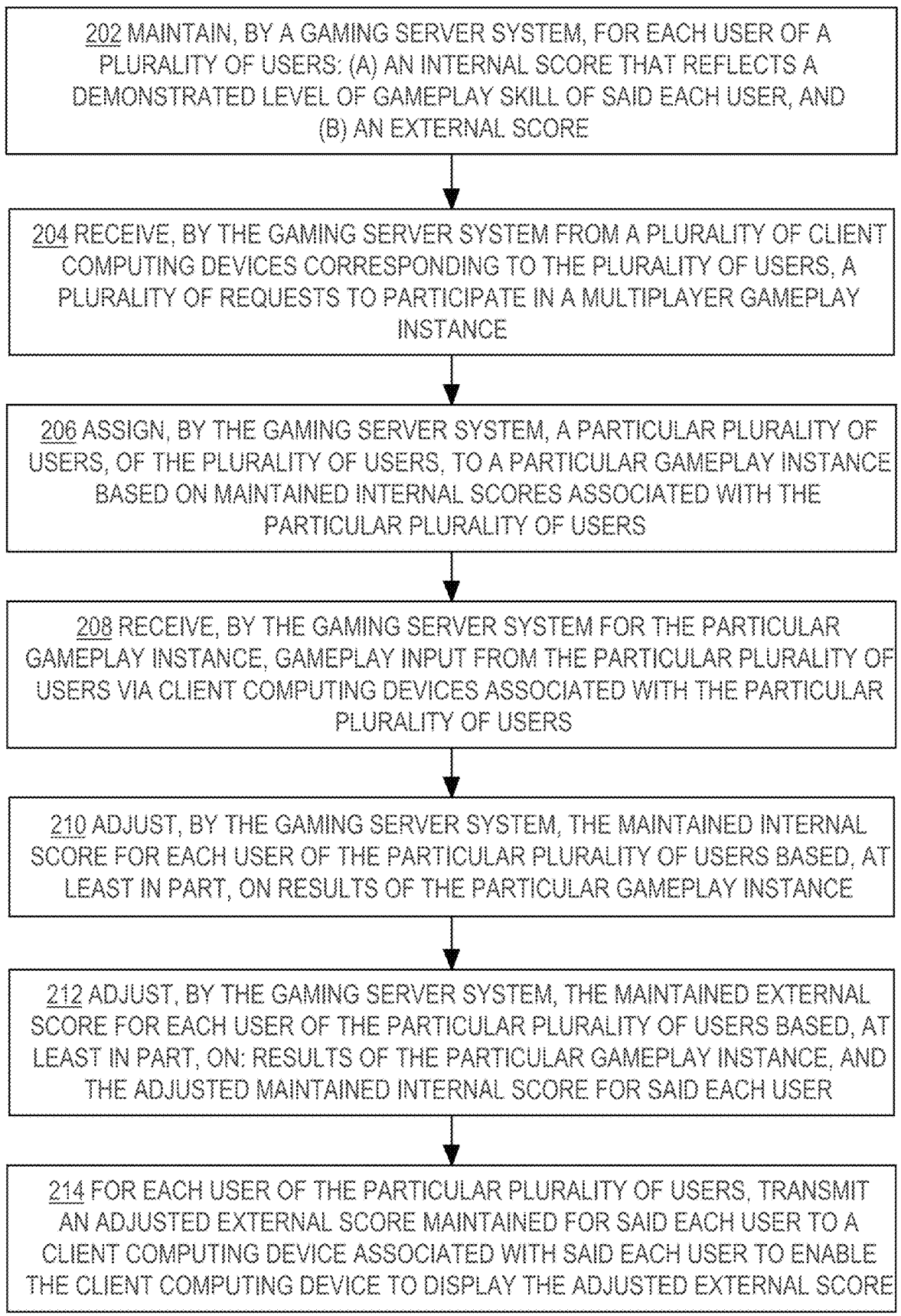
FIG. 2 depicts a flowchart for maintaining bifurcated scores for users of a gameplay application.

FIG. 2 depicts a flowchart 200 for maintaining bifurcated scores for users of a gameplay application, where updating external scores is based on gameplay results and on maintained internal scores. Embodiments are described herein as being implemented on example network configuration 100 of FIG. 1, but may be implemented on any configuration of computing resources.

At step 202 of flowchart 200, a gaming server system maintains, for each user of a plurality of users: (a) an internal score that reflects a demonstrated level of gameplay skill of said each user, and (b) an external score. For example, gameplay application 122 maintains, in data store 140, an internal score and an external score for each user of a plurality of users that participate in gameplay instances initiated by the application. Because the scores are bifurcated, they may be maintained separately and used to accomplish different purposes, as described in detail above.

Multiplayer Gameplay Instance

At step 204 of flowchart 200, the gaming server system receives a plurality of requests, to participate in a multiplayer gameplay instance, from a plurality of client computing devices corresponding to the plurality of users. For example, gameplay application 122 receives, via network 110, requests to participate in gameplay instances from multiple client computing devices 130A-N associated with multiple users of the application. For example, the requests identify the users and their associated client computing devices.

At step 206 of flowchart 200, the gaming server system assigns a particular plurality of users, of the plurality of users, to a particular gameplay instance based on maintained internal scores associated with the particular plurality of users. For example, based on each request to participate in a gameplay instance received at gameplay application 122, gameplay application 122 retrieves the internal score of the user associated with the request from data store 140. Based on the maintained internal scores of the users that submitted requests, gameplay application 122 assigns particular users to a particular gameplay instance.

A gameplay instance comprises a particular set of user inputs to gameplay application 122. Gameplay application 122 determines a result for the gameplay instance based on the user inputs and on a set of gameplay rules. Users may participate in a gameplay instance over a duration of time, e.g., with images and/or animations being displayed at the client computing devices throughout the duration, and where the users provide multiple inputs throughout the duration of time. Alternatively, users may participate in a gameplay instance by inputting data to gameplay application 122 and receiving the results, e.g., via a GUI displayed at the client computing devices.

The internal scores may be used in any way to assign users to gameplay instances. For example, gameplay application 122 receives requests to participate in gameplay from users A-F. In this example, the internal scores have a minimum of −4.000. The maintained internal scores for the users that submitted gameplay requests are as follows: user A: 1.835; user B: 2.011; user C: −1.231; user D: −1.007; user E: 1.989; and user F: −0.845. Users with similar internal scores have even, or close-to-even, odds of doing well during gameplay, and it is more enjoyable to participate in gameplay with users that are at or near the same skill level. Thus, based on relative similarity of the internal scores maintained for these users, gameplay application assigns users A, B, and E to participate in a first gameplay instance, and users C, D, and F to participate in a second gameplay instance.

At step 208, the gaming server system receives, for the particular gameplay instance, gameplay input from the particular plurality of users via client computing devices associated with the particular plurality of users. For example, gameplay application 122 receives, from users A, B, and E, via respective client computing devices 130A, 130B, and 130E, gameplay input for the first gameplay instance to which these users were assigned. Gameplay application 122 calculates a result of the first gameplay instance using the gameplay input from the users and one or more gameplay rules. For example, based on the received user input and a set of gameplay rules, gameplay application 122 ranks users A, B, and E that participated in the first gameplay instance.

Adjusting Internal Scores

At step 210 of flowchart 200, the gaming server system adjusts the maintained internal score for each user of the particular plurality of users based, at least in part, on results of the particular gameplay instance to produce an adjusted maintained internal score for said each user. Continuing with the previous example, gameplay application 122 uses the determined results of the first gameplay instance to adjust the internal scores of users A, B, and E.

Adjusting the internal scores could be performed using a variety of techniques. For example, gameplay application 122 adjusts the internal scores of the users based on a Bayesian approximation technique, as described in Weng, et al., "A Bayesian Approximation Method for Online Ranking". J. Mach. Learn. Res. 12, February 2011, 267-300 (referred to herein as the "Internal Ranking Paper"), the entire contents of which are incorporated by reference as if fully set forth herein.

To illustrate, the internal score of a user may be calculated based on update rules using a Bradley-Terry model with full-pair ("Algorithm 1"), as described in the Internal Ranking Paper, where gamma is based on the standard deviation of the user's skill. As another example, the internal score of a user may be calculated based on Algorithm 1 described in the Internal Ranking Paper, where the skill update and the variance update are further based on respective constant values that allow an administrator to control the pace of score increase/decrease. Specifically, these constants provide control over the rate at which users gain or lose internal score points to increase the perception of fairness and user satisfaction in the game, since it is not known ahead of time the way the players will interact with the game.

According to another embodiment, variance for users is bounded by a maximum and a minimum (e.g., 0.3). The minimum variance ensures that the internal scores of the users have some mobility, which is helpful when gameplay is based (at least in part) on random factors. Given the randomness of a game, it may be difficult to adjust a user's score if the user has had a streak of bad or good luck that causes the system to assign a lower or higher internal score to the user (with a higher confidence/lowered variance) than is warranted by the user's actual skill. According to an embodiment, the maximum variance (e.g., 0.6) is configured to be double the minimum variance, which reduces flux in the number of points assigned to users when a user account is new (at high variance) vs. when the user account is well-established (at low variance).

According to an embodiment, results of a multiplayer gameplay instance include a rank, for the gameplay instance, of each user that participated in the gameplay instance. To calculate a particular user's internal score based on results of a particular gameplay instance, gameplay application 122 calculates an adjustment value for the user. The adjustment value is based, at least in part, on a value $\Omega$, which is adjusted (a) higher for every other participant in the gameplay instance that the user ranks above in the gameplay results, and (b) lower for every other participant in the gameplay instance that the user ranks below in the gameplay results.

Furthermore, the adjustments to $\Omega$ for a given user calculated from the results of a gameplay instance are based on the internal scores of users that participated in the gameplay instance. Specifically, each adjustment to $\Omega$ for a given user is based on a comparison between the internal score of the user and the internal score of another user that participated in the gameplay instance, such that a win or loss over a user with a higher internal score has a different impact on the $\Omega$ of the user than a win or loss over a user with approximately the same internal score or a lower internal score.

For multiplayer gameplay instances, the resulting $\Omega$ for each user is equal to the summation of a plurality of "pairwise" $\Omega$'s determined for the user against all other users. A positive resulting $\Omega$ is considered a "win", and a negative resulting $\Omega$ is considered a "loss". Determining a "pairwise" $\Omega$ for a particular user with respect to a second user involves determining whether the particular user's placement in the gameplay results is ahead of the placement of other user (if so, it's a "win"), which is then scaled based on the difference in the internal score of the particular user and the internal score of the other user. If the internal score of the particular user is higher than the internal score of the other user, the pairwise Ω value is adjusted to reduce the Ω value, which reduces value of a win or increases the detriment of a loss. Conversely, if the internal score of the particular user is lower than the internal score of the other user, the pairwise Ω value is adjusted to increase the Ω value, which increases the value of a win or decreases the detriment of a loss. Thus, a "tie" result of a gameplay instance causes the value of Ω to be zero only if both users' internal scores are the same.

Figure 3:
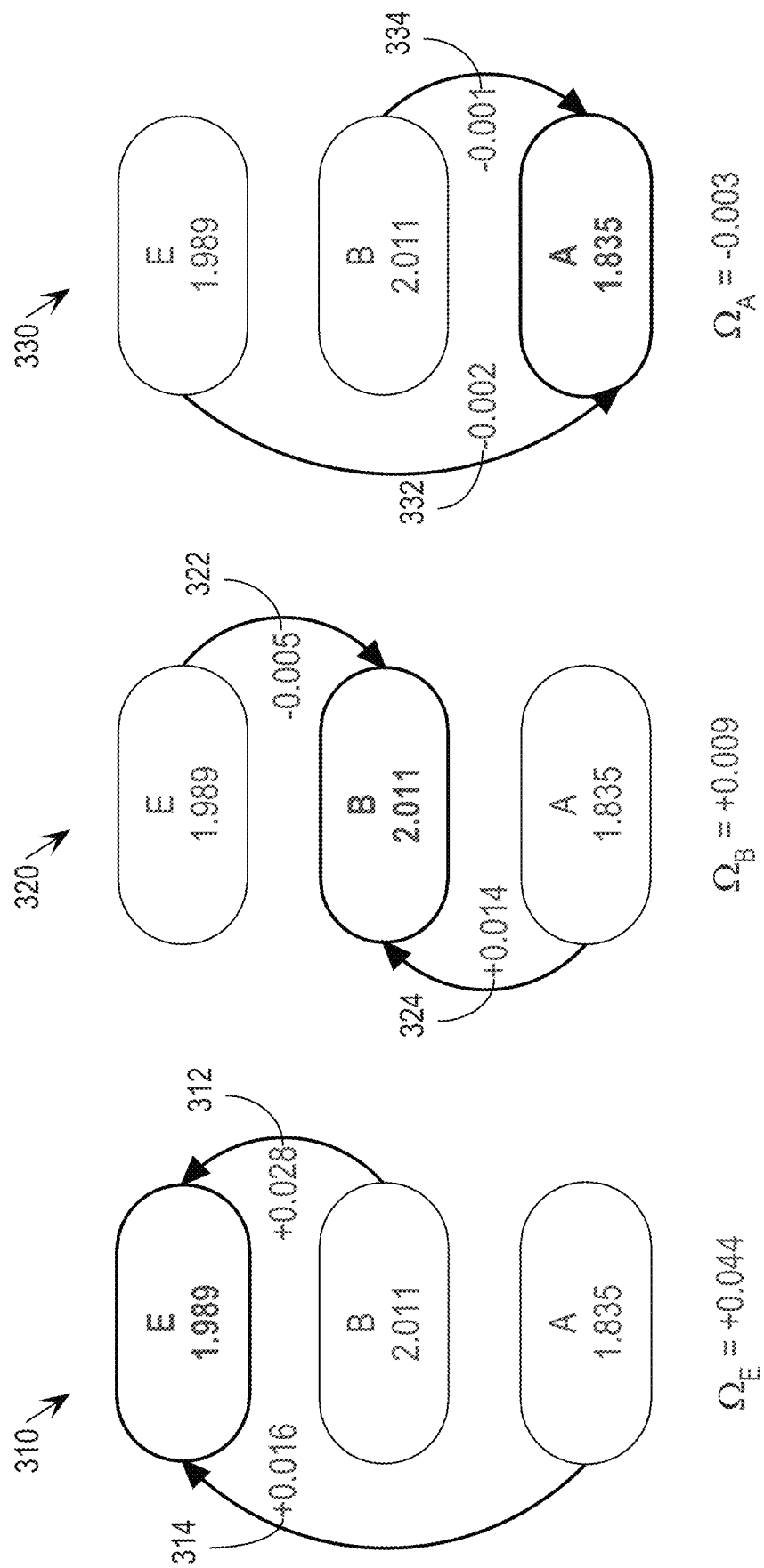
FIG. 3 depicts calculations to adjust the internal scores of users based on the results of gameplay.

For example, results of the first gameplay instance indicate the following rankings of users A, B, and E: user E—first place; user B—second place; and user A—third place. Going into the gameplay instance, user B has the highest internal score, at 2.011, user E has the second-highest internal score, at 1.989, and user A has the third-highest internal score, at 1.835. FIG. 3 depicts calculations for adjusting the internal scores for each of users A, B, and E, via adjustments to Ω that are based on the rankings for the first gameplay instance and the internal scores of each user. Each of the calculations depicted in FIG. 3 presuppose an initial Ω of zero for each user.

At example 310 of FIG. 3, gameplay application 122 makes adjustment 312 of +0.028 to $\Omega_E$ based on user E ranking above user B in the gameplay instance results and makes adjustment 314 of +0.016 to $\Omega_E$ based on user E ranking above user A in the gameplay instance results, to get $\Omega_E$=+0.044. Note that the magnitude of adjustment 312 based on user E ranking above user B (with the highest internal score) is greater than the magnitude of adjustment 314 based on user E ranking above user A (with the lowest internal score).

At example 320, gameplay application 122 makes adjustment 322 of −0.005 to $\Omega_B$ based on user B ranking below user E in the gameplay instance results, and makes adjustment 324 of +0.014 to $\Omega_B$ based on user B ranking above user A in the gameplay instance results, to get $\Omega_B$=+0.009. Note that the magnitude of adjustment 324 is less than the magnitude of adjustment 314 and of adjustment 312 based, at least in part, on one or both of: user B ranking second (rather than first as with user E) in the gameplay instance results, and user B having a higher internal score than user A.

At example 330, gameplay application 122 makes adjustment 332 of −0.002 to OA based on user A ranking below user E in the gameplay instance results, and makes adjustment 334 of −0.001 to $\Omega_A$ based on user A ranking below user B in the gameplay instance results, to get $\Omega_A$=−0.003. Note that adjustment 334 based on user A ranking lower than user B (who has the highest internal score) in the gameplay instance results has a lesser magnitude than adjustment 332 based on user A ranking below user B (who has the second-highest user score) in the gameplay instance results. Also, adjustment 334 and adjustment 332 have lesser magnitudes than adjustment 322 based on user B (with the highest internal score) ranking below user E (who has the second-highest user score) in the gameplay instance results. The smaller losses represented by adjustments 332 and 334 are based, at least in part, on user A having a lower internal score than users B and E.

To illustrate the adjustments to the maintained internal scores for users A, B, and E, a simple internal score adjustment is assumed where the calculated Ω value from the results of a particular gameplay instance is the amount by which each user's internal score is adjusted, i.e., $r^{(i)'}=r^{(i)}+\Omega$. Thus, after participating in the first gameplay instance, user A is associated with the internal score 1.832, user B is associated with the internal score 2.020, and user E is associated with the internal score 2.033.

Adjusting External Scores

At step 212 of flowchart 200, the gaming server system adjusts the maintained external score for each user of the particular plurality of users based, at least in part, on: results of the particular gameplay instance, and the adjusted maintained internal score for said each user. For example, gameplay application 122 uses the determined results of the first gameplay instance to adjust the internal score of each of users A, B, and E, as described in detail above. After adjusting the internal scores of the users, gameplay application 122 adjusts the external scores of the users based on the results of the first gameplay instance and based on the adjusted internal scores of the users.

Gameplay application 122 may adjust external scores for users based on the determined results of a gameplay instance in any way. For example, the external score for a user may be adjusted based on one or more of the following, which are indicated in the results of a particular gameplay instance: points earned by the user via participation in the gameplay instance, points earned by other users via participation in the gameplay instance, user rankings, etc. According to an embodiment, gameplay application 122 adjusts the external scores for users based on Ω values calculated (based on gameplay instance results) for the internal score adjustments of the users, as described in detail above.

According to an embodiment, gameplay application 122 adjusts external scores for users further based on the adjusted internal scores of the users. Specifically, when external scores are seasonally reset, it can be advantageous to allow skilled users to quickly increase their external scores that were reset at the beginning of the current season to align with the internal scores of the users. Thus, according to an embodiment, gameplay application 122 accelerates the increase of external scores in proportion to the magnitude of difference between the internal scores of the users and the external scores of the users. In other words, gameplay application 122 accelerates external score gains based on internal scores of users being higher than their external scores. This technique of internal-external score difference reduction rewards skilled users with satisfying point gains and causes the users' external scores to reflect demonstrated user skill more quickly.

More specifically, according to an embodiment, when the results of a particular gameplay instance cause gameplay application 122 to increase a particular user's internal score, a difference between the user's adjusted internal score and the user's external score is used to scale the gain value for the external score. Thus, the user's external score gain is proportional to the difference between their external score and internal score. According to an embodiment, the scaled external score gain is capped at a particular threshold magnitude, such as 0.25. The capped gain limits the importance of earlier gameplay, which (without the cap) could be vastly more valuable than games that are later in the season for users with very high internal scores. Thus, while gameplay that is later in the season is not scaled as heavily as gameplay at the beginning of the season, the perceived difference in gain magnitude is not so great that it reduces the enjoyment of later gameplay.

According to an embodiment, gameplay application 122 determines the scale factor to be applied to the external score gain value for a particular user based on a rate modifier ρ calculated according to the following Formula 1:

$$\rho = \max\left(\frac{r^{(i)} - r^{(e)}}{\kappa}, 1\right) \quad \text{Formula 1}$$

In Formula 1, κ is a tunable rate modifier factor, $r^{(i)}$ represents a user's internal score, and $r^{(e)}$ represents the user's external score. Thus, the greater the difference between a user's internal and external scores, the higher the rate modifier ρ will be. According to an embodiment, the lowest that ρ runs is 1. Thus, when there is a very small difference between a higher internal score and a lower external score for a user or when the external score is higher than the internal score for a user, gains on the user's external score is not scaled up.

According to an embodiment, when the difference between the internal score and the external score of a user (internal score−external score) is less than a particular threshold (such as 0.25), then ρ is set to 1.0. The intuition behind this embodiment is that if a user's external score is relatively close to the user's internal score, or is higher than the internal score, the "catch-up" mechanism is not applied to external score adjustments.

According to an embodiment, gameplay application 122 uses the rate modifier ρ to determine an additional score-dependent augmentation, α, which is added to the external score gain ($\delta_0$) for a user after participating in a particular gameplay instance.

$$\alpha = (\rho - 1.0) \cdot \text{RATE\_ADDITION\_BASE} \quad \text{Formula 2}$$

RATE_ADDITION_BASE is a constant that provides administrators a control for the magnitude of a added to the users' external scores. Because α is based on ρ, adding α to the user's gameplay-based gain provides a boost to the user's external score commensurate to the difference between the user's internal score and external score. If ρ is 1 (the lowest value of φ, then α is 0 and the additional score-dependent augmentation has no effect on the resulting gain. Based on the difference between the internal score and the external score of a given user, the additional score-dependent augmentation, α, hastens the return of the external score to the level of the internal score of the user. In fact, if there is a very large difference between the internal score and external score of a given user, depending on the value of RATE_ADDITION_BASE, the user may not lose points (or even may gain some points) when the user loses in the results of a gameplay instance.

According to an embodiment, gameplay application 122 determines the amount of external score gain ($\delta_0$) for a user according to the following Formula 3:

$$\delta_0 = \min(\alpha + \rho \cdot \text{UPDATE\_RATE\_MMR} \cdot \Omega + p_r(e), C) \quad \text{Formula 3}$$

In Formula 3, UPDATE_RATE_MMR is a score update rate constant, which is a tunable parameter to allow an administrator to control the amount of external score gain based on the results of gameplay; Ω is a value that reflects the results of gameplay and is used for internal score updates performed by gameplay application 122, e.g., described in detail above; and $p_r(e)$ is a progression factor described in further detail below. According to an embodiment, ρ is only applied to the determination of external score gain for a given user when Ω is positive (i.e., the results of the gameplay instance indicate that the external score for the user should be increased).

In Formula 3, C is the gain cap, which may be a constant. According to an embodiment, the value of C is different for various users, depending on the outcome of participating in a gameplay instance. In an embodiment where gameplay results in win/loss/tie, C has a first value when the user won (e.g., $C_{gain}$=0.250) and a second value when the user did not win (e.g., $C_{loss}$=0.020). The gain cap that is applicable when the user has not won ($C_{loss}$) guards against the possibility of the additional score-dependent augmentation, α, providing a gain that is too high (i.e., when there is a large difference between a user's internal and external scores), which could be perceived as commensurate with the point gain associated with a win.

In an embodiment where gameplay results in user ranks (e.g., where more than two users compete), C is scaled based on the user's rank, e.g., C=numWins·$C_{gain}$/numPlayers−1) where numWins is the number of users that ranked lower than the given user, and numPlayers is the total number of users that participated in the gameplay instance. In this embodiment, $C_{gain}$ may be the same value as for a win/tie/loss-style gameplay instance, or may be a different value. To illustrate, where $C_{gain}$=0.250, the number of participants in a given gameplay instance is 8, and the rank of a given player participant is 3, the player's gain is capped at 5*0.250/7=0.179. This scaled win cap ensures that the boosts from the internal score being lower than the external score does not warp perception of the value of rank results. Furthermore, in effect, the scaled gain cap is the generalized version of the win/tie/loss cap.

Progression Factor

According to an embodiment, gameplay application 122 increases the maintained external score for each user of the particular plurality of users that participated in a particular gameplay instance based on a determined progression factor (i.e., $p_r(e)$ in Formula 3 above). The progression factor incentivizes engagement with the gaming system, and rewards users for participating in games.

For example, when adjusting a user's external score, gameplay application 122 determines whether the user has a maintained external score that is lower than a particular threshold. Responsive to determining that the user has a maintained external score that is lower than the particular threshold, gameplay application 122 adds a progression value to the maintained external score for said each user. According to an embodiment, adding the progression value to the external user scores after participation in a gameplay instance is performed whether or not the change to the user's external score as a result of the gameplay is positive.

Addition of such a progression factor during adjustment of external scores, which is larger when external scores are lower, incentivizes gameplay when external scores of the users are low. Furthermore, the application of the progression factor works to close any gap between the external score maintained for a user and the internal score maintained for the user. For example, a user with a high skill level has an internal score of 6.254 and an external score of 0 at the outset of a given season. While the user's external score is below a particular threshold, such as 3.000, gameplay application 122 adds a progression value to the external score every time the user plays, which increases gains and decreases losses for users to which the progression factor is applicable.

According to an embodiment, gameplay application 122 maintains a series of thresholds associated with different progression values such that the progression values added to a user's external score in connection with adjusting the external score grows smaller as the external score grows larger. For example, when gameplay application 122 determines that a user's external score is lower than 1.000, the application adds 0.003 to the user's external score after every gameplay, when gameplay application 122 determines that a user's external score is between 1.000 and 2.000, the application adds 0.002 to the user's external score after every gameplay, and when gameplay application 122 determines that a user's external score is between 2.000 and 3.000, the application adds 0.001 to the user's external score after every gameplay. According to an embodiment, the progression factor is not available for users with external scores higher than a final tier of external scores associated with progression values. Thus, the reward for participating in games is more pronounced for users with lower external scores.

Continuing with the example first gameplay instance described above, application of Formula 3 to each of users A, B, and E is illustrated. In this example, $\kappa=2$, and UPDATE_RATE_MMR=1.5, the applicable progression factors are the tiered progression factors indicated above, and the users' external scores are all 0.000 for purposes of explanation (which is transformed to 4000 for external display). Because user A has a negative $\Omega$ (−0.003), the rate modifier ($\rho$) for user A is 1. Accordingly, a is 0 and the additional score-dependent augmentation has no effect on the resulting gain. Furthermore, where $C_{gain}=0.250$, the applicable $C=0\cdot 0.250/(2)=0$. Because the external score of user A is 0.000 prior to participating in the gameplay instance, the applicable progression factor is 0.003. Thus, for user A, $\delta_0=\min(1\cdot 1.5\cdot -0.003+0.003, 0)=-0.002$ (rounded to the nearest thousandths place). Thus, the external score for user A is −0.002 after participating in the first gameplay instance, which is transformed to 3998 for external display.

For user B, $\rho=(2.020-0)/2=1.01$. Accordingly, for user B where RATE_ADDITION_BASE is 0.15, $\alpha=(1.01-1.0)\cdot 0.15=0.002$. Furthermore, where $C_{gain}=0.250$, the applicable $C=1\cdot 0.250/(2)=0.125$. Because the external score of user B is 0.000 prior to participating in the gameplay instance, the applicable progression factor is 0.003. Thus, for user B, $\delta_0=\min(0.002+1.01\cdot 1.5\cdot 0.009+0.003, 0.125)=0.019$. Accordingly, the external score for user B becomes 0.019 after participating in the first gameplay instance, which is transformed to 4019 for external display.

Furthermore, for user E, $\rho=(2.033-0)/2=1.0165$. Accordingly, for user E, $\alpha=(1.017-1.0)\cdot 0.15=0.003$. Furthermore, where $C_{gain}=0.250$, the applicable $C=2\cdot 0.250/(2)=0.250$. Because the external score of user E is 0.000 prior to participating in the gameplay instance, the applicable progression factor is 0.003. Thus, for user E, $\delta_0=\min(0.003+1.0165\cdot 1.5\cdot 0.044+0.003, 0.25)=0.073$. Accordingly, the external score for user E becomes 0.073 after participating in the first gameplay instance, which is transformed to 4073 for external display.

Display of User External Scores

At step 214 of flowchart 200, an adjusted external score maintained for each user, of the particular plurality of users, is transmitted to a client computing device associated with said each user to enable the client computing device to display the adjusted external score. For example, gameplay application 122 generates graphical user interface (GUI) information (e.g., according to GUI instructions 124) that, when processed by a client computing device 130, causes the client computing device to display a GUI. According to an embodiment, gameplay application 122 causes GUI information to be sent via a network 110 to a particular client computing device 130E associated with user E. The external score displayed at a client computing device may be the same external score maintained in data store 140, or may be a transformed version of the maintained external score, e.g., $r^{(e)'}=r^{(e)}\times 1000+4000$.

Figure 4:
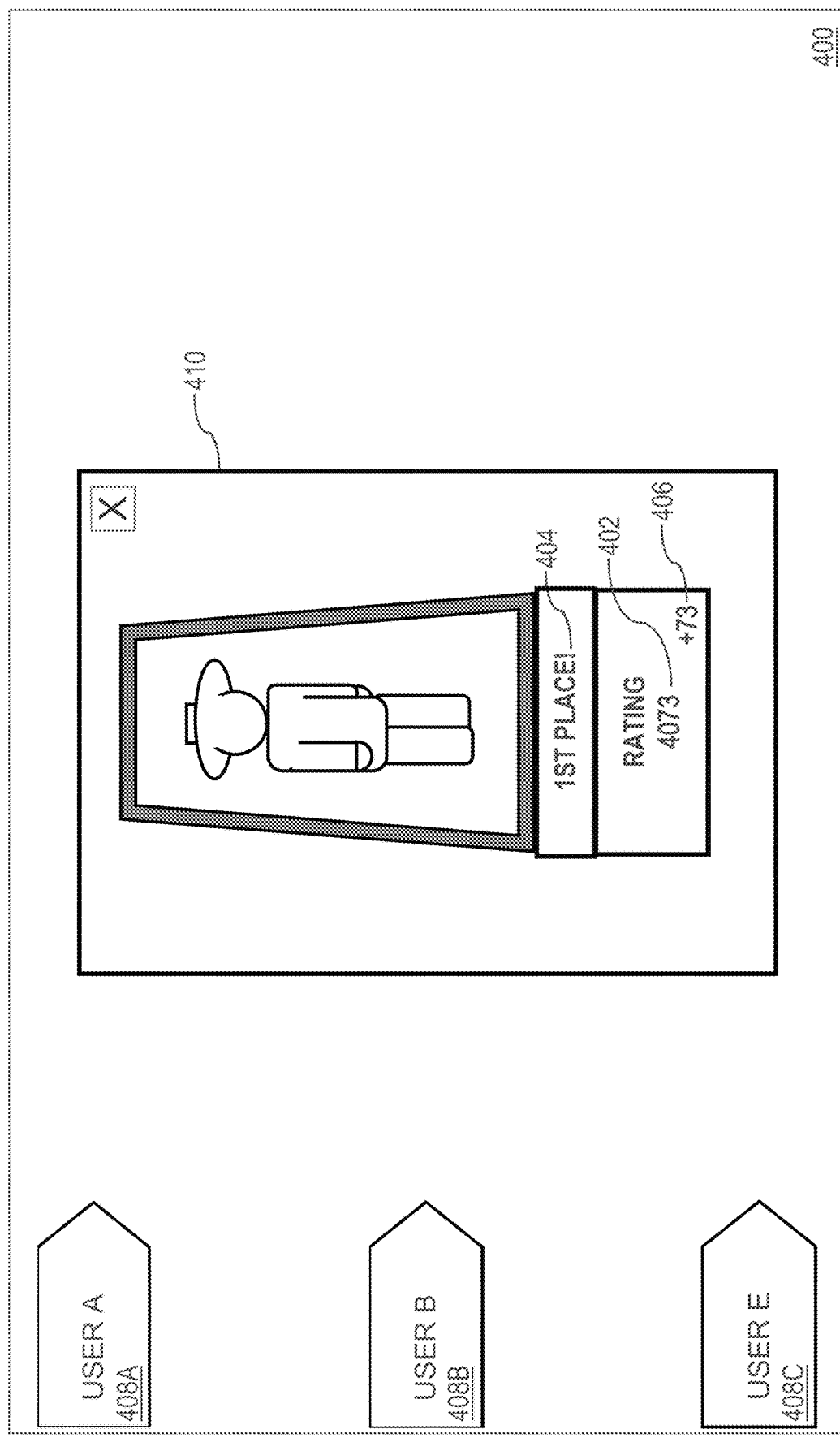
FIG. 4 depicts an example graphical user interface that is displayed at a client computing device based on the received graphical user interface information.

GUI 400 of FIG. 4 is an example GUI that is displayed at client computing device 130E based on GUI information received at the client device from gameplay application 122. Example GUI 400 comprises a transformed external score 402 of user E associated with the client computing device. In this example, gameplay application 122 maintains an external score ($r^{(e)}$) for user E of 0.073, and displays a transformed version of the score ($r^{(e)'}$) of "4073" via GUI 400, i.e., which is transformed according to the following formula: $r^{(e)'}=r^{(e)}\times 1000+4000$.

GUI 400 further depicts a ranking result 404 of the first gameplay instance in which user E participated, an external score gain value 406 that has been added to the user's external score based on the completed gameplay instance, and indicators 408A-C showing users that participated in the gameplay instance. In example GUI 400, the external user score information is presented in a closable window 410.

Seasonal Normalization of Internal Scores

According to an embodiment, at the beginning of each season, gameplay application 122 normalizes, to a standard Gaussian (or normal) distribution, the internal scores maintained in data store 140. For example, gameplay application 122 transforms the set of maintained internal scores such that the distribution of the transformed internal score data set has a mean of 0 and a standard deviation of 1. Specifically, for each internal score value $v_i$, a corresponding value is identified on a Gaussian distribution (which is scaled to the desired internal score value range (e.g., −4.0 to 4.0)) based on the quantile of the value $v_i$ in the current distribution of internal scores matching the quantile of the matching value on the Gaussian distribution. For example, the internal score in the current distribution that is higher than 25% of all other internal scores in the distribution is mapped to the score of the scaled Gaussian distribution that is at the $25^{th}$ quantile of the Gaussian distribution.

Figure 5:
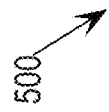
FIG. 5 depicts example mapping data used to normalize internal scores associated with users of a gaming system.

FIG. 5 depicts example mapping data 500 that maps internal score values of a current distribution to a Gaussian distribution that is scaled with a low of −4.0 and a high of 4.0. Mapping data 500 includes example rows 502-532 with example original to normalized internal score mappings. Because the mapping data is generated based on the state of the internal scores at the time of normalization, the mapping data is dependent on the actual internal score values found at that time. Based on mapping data 500, any internal score of −5.0 is normalized to −4.0 (as shown in row 502), any internal score of −3.951 is normalized to −3.090 (as shown in row 504), any internal score of 6.676 is normalized to 2.878 (as shown in row 528), any internal score of 7.416 is normalized to 3.090 (as shown in row 530), etc. Any original internal scores that fall between rows in the mapping data, such as 6.822, is normalized using linear interpolation of the mapping data that is just above and just below the original internal score (in this case, rows 528 and 530). To illustrate, based on mapping data 500, the original internal score of 6.822 is normalized to 2.920 using linear interpolation between rows 528 and 530.

Because the internal scores are not displayed to users, this seasonal normalization does not affect how well the users enjoy playing the game with respect to their scores. However, normalization of the internal scores corrects any inflation of the scores. Normalization of the internal scores further allows gameplay application 122 to compare user skill levels more accurately, e.g., to determine user rankings within the game, and to match users with similar skill levels for multiplayer gameplay instances, etc.

Score Floors

According to an embodiment, gameplay application 122 implements one or more external score floors. When a user's external score rises above an external score floor during a given season, the user does not subsequently drop below the score floor because of gameplay instance results during that season. For example, gameplay application 122 implements external score floors at 0.5 increments from −2.000 to 2.000 external score values. Implementation of external score floors incentivizes exploration of gameplay techniques without the threat of loss of score.

One way to unfairly exploit external score floors is, once a user has passed an external score floor, the user intentionally does poorly during many gameplay instances to drop the user's internal score while the external score is maintained at the score floor level, e.g., intentionally dropping the internal score to −2.000 while the external score stays at 2.000 (at a score floor). Subsequent to this internal score reduction, the user is matched with other users with internal scores at or around the user's reduced internal score, who have significantly less skill than the user. These matches provide the user with easy "wins" that add to the external score of the user. The external score is thereby artificially inflated to very high levels without requiring the user to increase their skill level.

To address this issue, according to an embodiment, gameplay application 122 also implements one or more internal score floors. According to an embodiment, for each user, gameplay application 122 records a user-specific internal score floor at the time that the external score of the user passes an external score floor. Thereafter, the external score of the user is not dropped below the external score floor, and the internal score of the user is not dropped below the user-specific internal score floor that was recorded for the user.

Internal score floors may cause internal rate inflation over time. However, when internal scores are normalized at the start of each season, any inflation is corrected at that time and the internal scores remain mathematically correct over time.

Coalition-Based Gameplay

According to an embodiment, users are able to join gameplay coalitions, e.g., of up to four users, and then request gameplay as a coalition. When users request gameplay as a gameplay coalition, gameplay application 122 assigns all users that are members of the coalition to the same gameplay instance. Participating in a gameplay instance as part of a coalition can be advantageous to the members of the coalition. For example, members of the coalition may share information in a way that other users that participate in the same gameplay instance cannot or will not.

According to an embodiment, users with internal scores over a high-skill internal score threshold, such as 5.5, are not allowed to join a gameplay coalition. This restriction prevents high-skill users from experiencing advantages from coalition gameplay at higher scoring levels, e.g., that compete for leader board recognition.

Positive Offset for Internal Scores of Coalition Members

Furthermore, to counteract coalition gameplay advantages, the internal scores of members of a coalition are temporarily increased while the users are playing as a coalition, according to an embodiment. This positive internal score offset is not applied to the external scores of the coalition members. The amount of internal score offset may depend on one or more factors, such as the size of the coalition (where a larger coalition size results in a larger internal score offset), and the geographical region associated with members of the coalition (e.g., based on the server through which the user connects to gameplay application 122). According to an embodiment, internal score offsets are added to internal scores, of coalition members, that are over a minimum offset threshold value (such as 1.000), which accounts for the fact that less-skilled users generally do not benefit from coalition-based gameplay as much as higher-skilled users.

To illustrate, gameplay application 122 maintains, in data store 140, internal score offset values associated with geographical regions, e.g., countries. In this example, the United States is associated with a positive offset of 0.100, China is associated with a positive offset of 0.105, and Canada is associated with a positive offset of 0.095. A particular gameplay coalition, which includes four users, requests gameplay at gameplay application 122. In order to match the gameplay coalition with other users for a gameplay instance, gameplay application 122 first applies an internal score offset to the internal scores of the members of the coalition. Specifically, for a particular user in the gameplay coalition that based in Canada, in response to determining that the particular user has an internal score that is over the minimum offset threshold value, gameplay application 122 determines an initial internal score offset for the particular user that is associated with the geographical region of the user, which is 0.095 associated with Canada. According to an embodiment, gameplay application 122 modifies the initial internal score offset based on a size of the particular gameplay coalition, e.g., by adding 0.010 for each member of the coalition. Thus, to calculate the final internal score offset for the particular user, gameplay application 122 adds 0.010 to the initial internal score offset of 0.095 for each of the four members of the coalition, which results in a final internal score offset of 0.135. Gameplay application 122 temporarily adds this final internal score offset to the maintained internal score for the particular user to produce an augmented internal score, and uses the augmented internal score for gameplay user matching while the user is a member of the particular coalition.

Because the internal scores of coalition members are boosted while they participate in the coalition, the coalition members are matched against users that are more skilled than the individual members of the coalition, which lessens the effect of advantages gained from playing as a group. Furthermore, the gameplay-based external score gain for each coalition member is scaled based on the boosted internal score, which can lessen the magnitude of the win-based increase for members of the coalition while they play as a group. The reduced external score gains from coalition-based gameplay further reduces the potential advantages of playing as a member of a coalition.

Counteracting Puppet Account-Based Coalition Exploitation

Furthermore, users may unfairly exploit coalition-based gameplay to inflate their external scores using "puppet" accounts. A puppet account is a user account, established by a user with one or more other accounts, which the user controls. The user may attempt to establish matches against a puppet account controlled by the user and then cause the puppet account to either concede or play automatically, which results in a "win" for the user's main account. One way to establish a match with a puppet account is to include the puppet account as a member of a gameplay coalition with the user's main account and then request gameplay for the coalition. Any puppet accounts included in the coalition will necessarily be included in the gameplay instance to which the coalition is assigned. During gameplay, the user exploits the puppet accounts in a coalition by ensuring that the puppet accounts lose to the main user account. Thus, the user "wins" over the puppet accounts. In a system that increases a particular user's score based on how many other users lose to (or rank below) the particular user for gameplay instances, winning over puppet accounts provides a boost in the ranking of the main user account.

In order to prevent such exploitation, according to an embodiment, any changes to the bifurcated scores of members of a coalition are based on gameplay instance results for users that are not participating in the gameplay instance as part of the same coalition. For example, users A-H participate in a particular gameplay instance, where users A-D participate in the gameplay instance as members of a coalition. The internal and external score adjustments for users E-H are based on the results of the gameplay instance for all of the users including the members of the coalition. However, the internal and external score adjustments for users A-D are based on results of the gameplay instance for users E-H. As such, if any of users A-D are based on puppet user accounts, the main user account in the coalition does not benefit from gameplay of the puppet users, while users E-H do benefit from gameplay of the puppet users (assuming these users rank above the puppet accounts in the gameplay instance results).

Another way to exploit coalition gameplay using puppet user accounts is adding puppet accounts to a coalition to bring the average internal score of the coalition members down. This can cause unfair matches when the average internal score of coalition members is used to identify other users to participate in gameplay instances with the members of the coalition. Thus, according to an embodiment, the maximum internal score of members of a coalition is used to match the coalition members with other users for a gameplay instance.

Using Internal Scores to Configure Non-Matchmaking Aspects of Gameplay Instances Internal scores maintained for users of gameplay application 122 may be used to configure non-matchmaking aspects of a gameplay instance, i.e., to tailor the gameplay aspects to demonstrated skill levels of users. Examples of configurable aspects of a gameplay instance include non-player characters (NPCs), puzzle challenges, available tools or other resources, etc. Internal scores may be used to configure non-matchmaking aspects of single-player gameplay instances or of multiplayer gameplay instances. When internal scores are used to configure non-matchmaking aspects of multiplayer gameplay instances, internal scores may or may not also be used for matchmaking for the gameplay instances.

To illustrate, gameplay application 122 receives requests to participate in a gameplay instance from one or more users. Gameplay application 122 assigns the users to one or more respective single-player gameplay instances. Gameplay application 122 determines the internal scores associated with a user assigned to a given gameplay instance, and configures one or more aspects of the gameplay instance based on the internal score of the user. For example, the difficulty level of a puzzle challenge included in the gameplay instance may be tailored to the user based on the internal score, where users with lower internal scores participate in easier puzzle challenges or in types or instances of puzzle challenges that require less knowledge of gameplay nuances, rules, strategy, and/or culture.

As another example, the behavior or skins of one or more NPCs of the gameplay instance may be based on the internal score of a user assigned to the gameplay instance. To illustrate, users having internal scores within a first range participate in gameplay instances with a barmaid NPC, while users having internal scores within a second range participate in gameplay instances with a rogue NPC, and users having internal scores within a third range participate in gameplay instances with a druid NPC. As a further illustration, users having internal scores within a first range participate in gameplay instances where an NPC provides a first set of information for the user, users having internal scores within a second range participate in gameplay instances where an NPC provides a second set of information for the user, etc.

As described above, gameplay application 122 receives gameplay input from the one or more users for a gameplay instance, and determines results for the gameplay instance. Gameplay application 122 adjusts the internal and external user scores based on the results of the gameplay instance, as described in detail above. For single-player gameplay instances, $\Omega$ may be based on any single-player metric, such as a total number of points that the user scored during gameplay compared to an aggregate (such as statistical mean, geometric mean, median, mode, etc.) number of points that users with similar internal scores obtain during similar gameplay instances.

Structural Overview

As indicated above, FIG. 1 depicts a computing system 100 comprising a server computer 120, client computing devices 130A-N, and a data store 140 communicatively coupled via network 110. Network 110 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The data store 140, server computer 120, client computing devices 130A-N, and other elements of the system each comprise an interface compatible with the network 110 and are programmed or configured to use standardized protocols for communication across the networks such as TCP/IP, Bluetooth, CAN protocol and higher-layer protocols such as HTTP, TLS, and the like.

Data store 140 comprises a storage medium configured to store at least the bifurcated scores for users of gameplay application 122. Data store 140 may reside in volatile and/or non-volatile storage, including persistent storage or flash memory, or volatile memory of server computer 120. Additionally, or alternatively, data store 140 may be stored, at least in part, in main memory of a computing device.

Data store 140 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Any database may be used that enables the systems and methods described herein.

Server computer 120 may be implemented using one or more server-class computers or one or more other computers having one or more processor cores, and/or co-processors.

Server computer 120 may be a physical server computer and/or a virtual server instance stored in a data center, such as through cloud computing.

Server computer 120 runs gameplay application 122. Generally, An application, such as gameplay application 122, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Server computer 120 further stores GUI instructions 124. GUI instructions 124 comprise computer readable instructions which, when executed by the server computer 120, cause the server computer to generate and cause one or more GUIs to be displayed on one or more of client computing devices 130A-N. The GUI may be generated by the server computer 120 and/or by one or more of client computing devices 130A-N.

Each of client computing devices 130A-N is a computer that includes hardware capable of communicatively coupling the device to one or more server computers, such as server computer 120, over one or more networks/internet service providers. For example, a client computing device 130A may include a network card that communicates with server computer 120 through a home or office wireless router (not illustrated in FIG. 1) coupled to an internet service provider. Each of client computing devices 130A-N may be a smart phone, personal computer, tablet computing device, PDA, laptop, or any other computing device capable of performing the functions described herein.

For purposes of illustrating a clear example, FIG. 1 shows a limited number of instances of certain functional elements. However, in other embodiments, there may be any number of such elements. For example, server computer 120 may communicate with any number of client computing devices 130. Further, the server computer 120 may be implemented using two or more processor cores, clusters, or instances of physical machines or virtual machines, configured in a discreet location or co-located with other elements in a datacenter, shared computing facility, or cloud computing facility. In other embodiments, one or more of the elements depicted herein may be combined.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
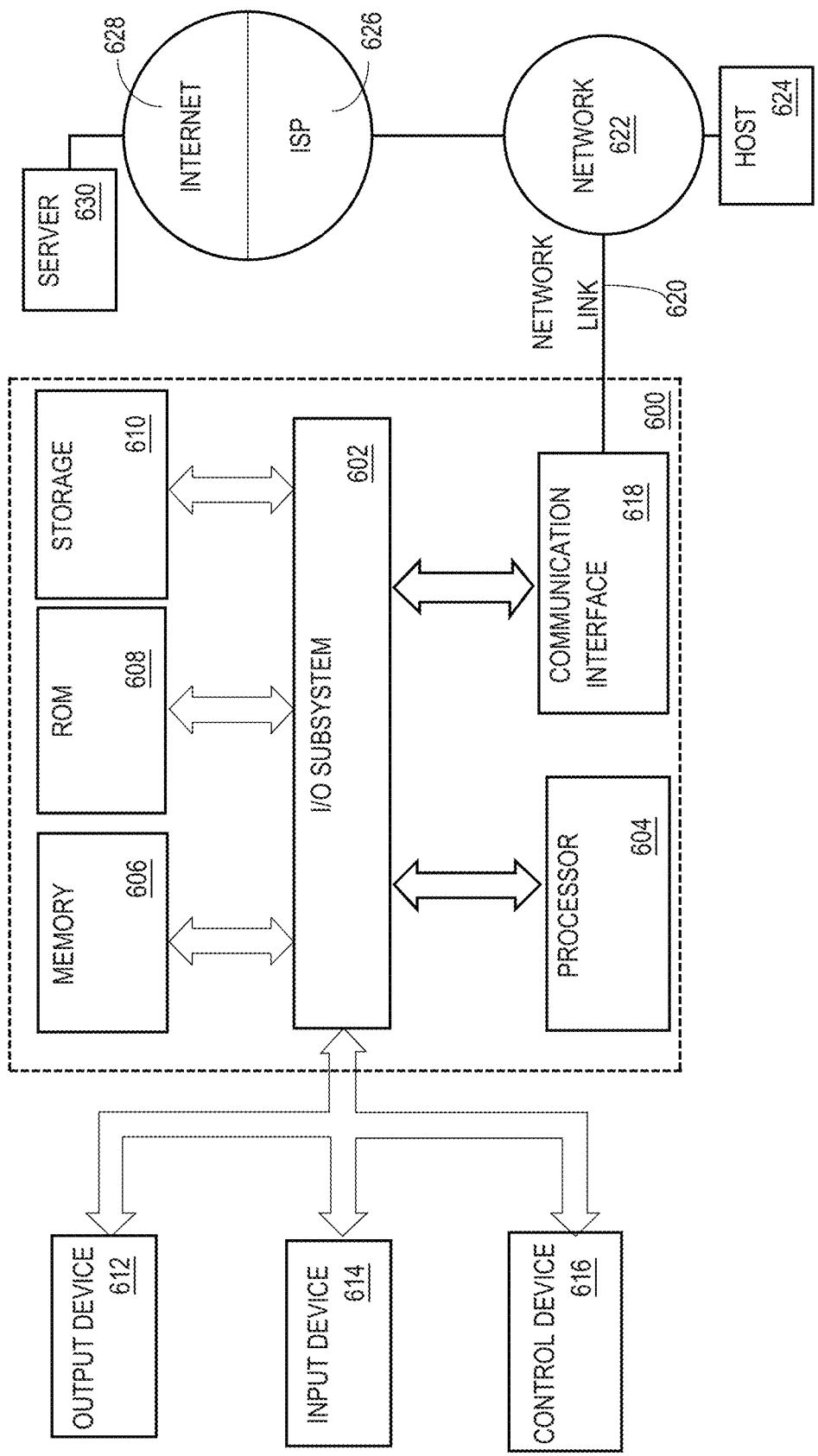
FIG. 6 is a block diagram that illustrates a computer system upon which an embodiment of the invention may be implemented

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:

maintaining, by a gaming server system, for each certain user of a plurality of users: (a) an internal score that reflects a demonstrated level of gameplay skill of said each certain user, and (b) an external score;

receiving, by the gaming server system from a plurality of client computing devices corresponding to the plurality of users, a plurality of requests to participate in a multiplayer gameplay instance;

assigning, by the gaming server system, a particular plurality of users, of the plurality of users, to a particular gameplay instance based on maintained internal scores associated with the particular plurality of users;

receiving, by the gaming server system for the particular gameplay instance, gameplay input from the particular plurality of users via client computing devices associated with the particular plurality of users;

adjusting, by the gaming server system, a maintained internal score for each user of the particular plurality of users based, at least in part, on results of the particular gameplay instance to produce an adjusted maintained internal score for said each user including a particular adjusted internal score for a particular user of the particular plurality of users; and adjusting, by the gaming server system, a maintained external score for said each user of the particular plurality of users based, at least in part, on:
 results of the particular gameplay instance, and
 the adjusted maintained internal score for said each user; and for said each user of the particular plurality of users, transmitting an adjusted external score maintained for said each user to a client computing device associated with said each user to enable the client computing device to display the adjusted external score;

the gaming server system tailoring skill-based aspects of gameplay to the particular plurality of users by performing at least one of:
 assigning the particular user of the particular plurality of users to a new gameplay instance based on the particular adjusted internal score of the particular user,
 configuring a new gameplay instance for the particular user of the particular plurality of users with one or more non-player characters (NPCs) based on the particular adjusted internal score of the particular user, or presenting the particular user of the particular plurality of users with a challenge, within a new gameplay instance, that is based on the particular adjusted internal score of the particular user.

2. The computer-executed method of claim 1, wherein said adjusting, by the gaming server system, the maintained external score for said each user of the particular plurality of users based on the adjusted maintained internal score for said each user comprises adjusting the maintained external score for said each user based, at least in part, on a difference between the adjusted maintained internal score for said each user and the maintained external score for said each user.

3. The computer-executed method of claim 2, wherein said adjusting, by the gaming server system, the maintained external score for said each user of the particular plurality of users based, at least in part, on the difference between the adjusted maintained internal score for said each user and the maintained external score for said each user comprises adding an augmentation value to the maintained external score for said each user, the augmentation value being scaled based on the difference between the maintained internal score for said each user and the maintained external score for said each user.

4. The computer-executed method of claim 2, wherein said adjusting, by the gaming server system, the maintained external score for said each user of the particular plurality of users based, at least in part, on the difference between the adjusted maintained internal score for said each user and the maintained external score for said each user comprises increasing the maintained external score for said each user by a score increase value that is proportional to the difference between the maintained internal score for said each user and the maintained external score for said each user.

5. The computer-executed method of claim 4, further comprising, for said each user of the particular plurality of users, capping the score increase value at a particular maximum value.

6. The computer-executed method of claim 5, further comprising, for said each user of the particular plurality of users, calculating the particular maximum value for the score increase value based, at least in part, on results of the particular gameplay instance for said each user.

7. The computer-executed method of claim 1, wherein said adjusting, by the gaming server system, the maintained external score for said each user of the particular plurality of users comprises:
said each user has the maintained external score that is lower than a particular threshold; and
responsive to said determining that said each user has the maintained external score that is lower than the particular threshold, adding a progression value to the maintained external score for said each user.

8. The computer-executed method of claim 7, further comprising identifying a particular progression value, for the particular user of the particular plurality of users, based, at least in part, on a particular external score maintained for the particular user by:
identifying a particular external score range, of a plurality of external score ranges associated with a respective plurality of progression values, in which the particular external score falls; and
identifying the particular progression value for the particular user to be the progression value that is associated with the particular external score range.

9. The method of claim 1, wherein:
said receiving the plurality of requests, assigning, receiving gameplay input, adjusting the maintained internal score for each user of the plurality of users, and adjusting the maintained external score for said each user of the particular plurality of users are performed during a first period of time;
the method further comprises, at the end of the first period of time, performing, by the gaming server system:
resetting the maintained external score for each user of the plurality of users, and
normalizing to a standard Gaussian distribution the maintained internal score for each user of the plurality of users.

10. The computer-executed method of claim 1, further comprising:
after adjusting, by the gaming server system, a particular maintained external score for the particular user of the particular plurality of users, determining that the particular maintained external score is higher than an external value floor;
responsive to determining that the particular maintained external score is higher than the external value floor, recording an internal value floor as the internal score of the particular user;
after determining that the particular maintained external score is higher than the external value floor:
preventing the internal score of the particular user from dropping below the recorded internal value floor, and
preventing the external score of the particular user from dropping below the external value floor.

11. The computer-executed method of claim 1, wherein:
the particular plurality of users comprises two or more users that are assigned to the particular gameplay instance as a group based on the two or more users being members of a gameplay coalition; and
adjusting the maintained external score for each user, of the two or more users, is based, at least in part, on user-specific results, of the particular gameplay instance, for users of the particular plurality of users other than the two or more users.

12. The computer-executed method of claim 1, wherein:
the particular plurality of users comprises two or more users that are assigned to the particular gameplay instance as a group based on the two or more users being members of a gameplay coalition; and
based on the two or more users being members of the gameplay coalition, an internal score used to assign each user of the two or more users to the particular gameplay instance is a maximum internal score maintained for the two or more users.

13. The computer-executed method of claim 1, wherein:
the particular plurality of users comprises two or more users that are assigned to the particular gameplay instance as a group based on the two or more users being members of a gameplay coalition; and
the method further comprises, based on the two or more users being members of the gameplay coalition, temporarily increasing maintained internal scores of the two or more users by a particular positive offset;
wherein said assigning the two or more users to the particular gameplay instance is based on at least one temporarily increased internal score maintained for the two or more users.

14. The computer-executed method of claim 13, wherein said adjusting the maintained external score for each user of the two or more users is further based, at least in part, on a difference between the temporarily increased internal score for said each user and the maintained external score for said each user.

15. The computer-executed method of claim 13, further comprising determining the particular positive offset for the particular user of the two or more users based, at least in part, on one or more of: a size of the gameplay coalition, or a geographical region associated with the particular user.

16. The computer-executed method of claim 13, wherein said increasing the maintained internal scores of the two or more users is performed responsive to determining that the maintained internal scores for the two or more users exceed a threshold value.

17. The computer-executed method of claim 1, further comprising:
including each user, of two or more users, in a gameplay coalition based, at least in part, on determining that the maintained internal score of said each user is below a particular threshold value;
wherein the particular plurality of users comprises the two or more users that are assigned to the particular gameplay instance as a group based on the two or more users being members of the gameplay coalition.

18. One or more non-transitory computer-readable media comprising one or more sequences of instructions that, when executed by one or more processors, cause:
maintaining, by a gaming server system, for each certain user of a plurality of users: (a) an internal score that reflects a demonstrated level of gameplay skill of said each certain user, and (b) an external score;
receiving, by the gaming server system from a plurality of client computing devices corresponding to the plurality of users, a plurality of requests to participate in a multiplayer gameplay instance;
assigning, by the gaming server system, a particular plurality of users, of the plurality of users, to a particular gameplay instance based on maintained internal scores associated with the particular plurality of users;
receiving, by the gaming server system for the particular gameplay instance, gameplay input from the particular plurality of users via client computing devices associated with the particular plurality of users;
adjusting, by the gaming server system, a maintained internal score for each user of the particular plurality of users based, at least in part, on results of the particular gameplay instance to produce an adjusted maintained internal score for said each user including a particular adjusted internal score for a particular user of the particular plurality of users; and
adjusting, by the gaming server system, a maintained external score for said each user of the particular plurality of users based, at least in part, on:
results of the particular gameplay instance, and
the adjusted maintained internal score for said each user; and
for said each user of the particular plurality of users, transmitting an adjusted external score maintained for said each user to a client computing device associated with said each user to enable the client computing device to display the adjusted external score
the gaming server system tailoring skill-based aspects of gameplay to the particular plurality of users by performing at least one of:
assigning the particular user of the particular plurality of users to a new gameplay instance based on the particular adjusted internal score of the particular user,
configuring a new gameplay instance for the particular user of the particular plurality of users with one or more non-player characters (NPCs) based on the particular adjusted internal score of the particular user, or
presenting the particular user of the particular plurality of users with a challenge, within a new gameplay instance, that is based on the particular adjusted internal score of the particular user.

19. The one or more non-transitory computer-readable media of claim 18, wherein said adjusting, by the gaming server system, the maintained external score for said each user of the particular plurality of users based on the adjusted maintained internal score for said each user comprises adjusting the maintained external score for said each user based, at least in part, on a difference between the adjusted maintained internal score for said each user and the maintained external score for said each user.

20. A computer-executed method comprising:
maintaining, by a gaming server system, for each certain user of a plurality of users: (a) a multi-season internal score that reflects a demonstrated level of gameplay skill of said each certain user during two or more time seasons, and (b) a season-based external score that is reset at the beginning of each time season;
receiving, by the gaming server system from one or more client computing devices corresponding to one or more users of the plurality of users, one or more requests to participate in a gameplay instance;
assigning, by the gaming server system, the one or more users, to a particular gameplay instance;
receiving, by the gaming server system for the particular gameplay instance, gameplay input from the one or more users via the one or more client computing devices;
adjusting, by the gaming server system, a maintained internal score for each user of the one or more users based, at least in part, on results of the particular gameplay instance to produce an adjusted maintained internal score for said each user;
adjusting, by the gaming server system, a maintained external score for said each user of the one or more users based, at least in part, on:
results of the particular gameplay instance, and
the adjusted maintained internal score for said each user; and
for said each user of the one or more users, transmitting the maintained external score to a client computing device associated with said each user to enable the client computing device to display the maintained external score;
the gaming server system tailoring skill-based aspects of gameplay to the one or more users by performing at least one of:
assigning said each user of the one or more users to a new gameplay instance based on the adjusted maintained internal score for said each user,
configuring a new gameplay instance for said user of the one or more users with one or more non-player characters (NPCs) based the adjusted maintained internal score for said each user, or
presenting said each user of the one or more users with a challenge, within a new gameplay instance, that is based on the adjusted maintained internal score for said each user.

21. The computer-executed method of claim 20, further comprising configuring, by the gaming server system, one or more skill-based aspects of the particular gameplay instance for the one or more users based on one or more maintained internal scores associated with the one or more users.

* * * * *